United States Patent
van den Bogerd et al.

(10) Patent No.: US 7,994,248 B2
(45) Date of Patent: Aug. 9, 2011

(54) FLAME RETARDANT THERMOPLASTIC POLYCARBONATE COMPOSITIONS

(75) Inventors: Joshua Arie van den Bogerd, Tholen (NL); Robert Dirk van Grampel, Tholen (NL); Jan-Pleun Lens, Rotterdam (NL)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 132 days.

(21) Appl. No.: 12/332,978

(22) Filed: Dec. 11, 2008

(65) Prior Publication Data

US 2010/0152344 A1 Jun. 17, 2010

(51) Int. Cl.
*C08K 5/523* (2006.01)
(52) U.S. Cl. .......... 524/127; 524/451; 524/494
(58) Field of Classification Search .......... 524/127, 524/451, 494
See application file for complete search history.

(56) References Cited

U.S. PATENT DOCUMENTS

| | | | |
|---|---|---|---|
| 4,746,701 A | 5/1988 | Kress et al. | |
| 5,364,899 A | 11/1994 | Watanabe et al. | |
| 5,380,795 A | 1/1995 | Gosens et al. | |
| 5,488,086 A | 1/1996 | Umeda et al. | |
| 6,441,068 B1 | 8/2002 | Eckel et al. | |
| 6,476,178 B1 | 11/2002 | Mitsuta et al. | |
| 6,593,404 B1 | 7/2003 | Shin et al. | |
| 6,613,820 B2 | 9/2003 | Fujiguchi et al. | |
| 6,613,824 B2 | 9/2003 | Campbell et al. | |
| 6,630,524 B1 | 10/2003 | Lim et al. | |
| 7,232,854 B2 * | 6/2007 | Ma et al. ........ | 524/127 |
| 2003/0083442 A1 | 5/2003 | Nishihara et al. | |
| 2003/0105226 A1 | 6/2003 | Cella et al. | |
| 2005/0182165 A1 | 8/2005 | Ma et al. | |
| 2006/0030647 A1 | 2/2006 | Ebeliing et al. | |
| 2006/0089434 A1 | 4/2006 | Nodera | |
| 2006/0205848 A1 | 9/2006 | Siripurapu et al. | |
| 2007/0072960 A1 | 3/2007 | Ma et al. | |
| 2007/0082995 A1 | 4/2007 | Costanzi et al. | |
| 2007/0093591 A1 | 4/2007 | Ma et al. | |
| 2007/0135540 A1 | 6/2007 | Taguchi | |
| 2007/0149661 A1 * | 6/2007 | Charati et al. ........ | 524/115 |
| 2007/0191518 A1 | 8/2007 | Chen et al. | |
| 2007/0213437 A1 | 9/2007 | Nagatoshi | |
| 2007/0213452 A1 | 9/2007 | Kawato et al. | |
| 2008/0015289 A1 | 1/2008 | Siripurapu | |
| 2008/0015290 A1 | 1/2008 | Siripurapu et al. | |
| 2008/0015291 A1 | 1/2008 | Siripurapu et al. | |
| 2008/0081860 A1 | 4/2008 | Li et al. | |
| 2008/0103267 A1 | 5/2008 | Hurst et al. | |
| 2008/0114103 A1 | 5/2008 | Hoeks et al. | |
| 2008/0246181 A1 | 10/2008 | Zhu et al. | |
| 2009/0215949 A1 * | 8/2009 | Fujiguchi et al. ........ | 524/430 |
| 2009/0312479 A1 * | 12/2009 | Ren et al. ........ | 524/451 |

FOREIGN PATENT DOCUMENTS

EP 069522 B1 6/1995
WO WO0181470 A1 11/2001

OTHER PUBLICATIONS

PCT International Search Report for International Application No. PCT/IB2009/055190.
Inventor: Minamisono Hideo, Abstract of JP 2005320473 (A), Flame-Retardant Thermoplastic Resin Composition; ; Publication Date Nov. 17, 2005: Applicant: Teijin Chemicals Ltd.

* cited by examiner

*Primary Examiner* — Peter Szekely
(74) *Attorney, Agent, or Firm* — Richard M. Klein; Fay Sharpe LLP

(57) ABSTRACT

Polycarbonate compositions are disclosed. The compositions comprise an optional polycarbonate polymer (A); a polycarbonate-polysiloxane copolymer (B); a phosphorous-containing flame retardant (C); and a reinforcing agent (D). The resulting compositions have an improved combination of properties, particularly Vicat softening temperature and high flame retardance in thin walls.

18 Claims, No Drawings

FLAME RETARDANT THERMOPLASTIC POLYCARBONATE COMPOSITIONS

BACKGROUND

The present disclosure relates to thermoplastic polycarbonate compositions that have increased flame retardance. Also disclosed are methods for preparing and/or using the same.

Polycarbonates (PC) are synthetic thermoplastic resins derived from bisphenols and phosgenes, or their derivatives. They are linear polyesters of carbonic acid and can be formed from dihydroxy compounds and carbonate diesters, or by ester interchange. Polymerization may be in aqueous, interfacial, or in nonaqueous solution. Polycarbonates are a useful class of polymers having many desired properties. They are highly regarded for optical clarity and enhanced impact resistance and ductility at room temperature or below.

However, polycarbonate polymers are not inherently non-flammable. It is thus typically necessary to include flame retardant additives, such as halogenated or non-halogenated additives, that retard the flammability of the resin and/or reduce dripping. Halogenated flame retardants containing bromide and/or chloride are increasingly subject to regulatory restrictions. Non-halogenated alternatives, including various fillers, phosphorous-containing compounds, and certain salts, have been used. However, it has been difficult to meet strict flame retardance standards using these non-halogenated alternatives, particularly in thin wall samples.

There remains a need in the art for thermoplastic polycarbonate compositions having improved heat resistance. Desirable features of such materials include, among others, excellent mechanical properties and ease of manufacture.

BRIEF DESCRIPTION

Disclosed, in various embodiments, are thermoplastic polycarbonate compositions that have increased flame retardance. Such compositions have many useful applications.

Disclosed in embodiments is a flame retardant thermoplastic composition, comprising: a polysiloxane-polycarbonate copolymer; an optional polycarbonate polymer; a phosphorous-containing flame retardant; and from about 0.01 to 25 weight percent of a filler comprising glass or talc; wherein the thermoplastic composition has a Vicat B50 softening temperature of at least 120° C., when measured according to ISO 306; and wherein an article molded from the thermoplastic composition can attain UL94 V0 performance at a thickness of 1.2 mm.

The polycarbonate polymer may be a bisphenol-A homopolymer. The polysiloxane-polycarbonate copolymer may comprise about 20 weight percent siloxane. The phosphorous-containing flame retardant may be bisphenol-A bis(diphenylphosphate).

The thermoplastic composition may comprise from about 0.5 to about 6 weight percent of siloxane originating from the polysiloxane-polycarbonate copolymer, including from about 1.2 to about 6 weight percent and from about 2.4 to about 6 weight percent. The thermoplastic composition may comprise from 5 to 100 parts by weight percent of the polysiloxane-polycarbonate copolymer and from 0 to 95 parts by weight of the optional polycarbonate polymer, based on a combined 100 parts by weight of the polysiloxane-polycarbonate copolymer and the optional polycarbonate polymer. The polysiloxane-polycarbonate copolymer may comprise from 50 to 99.9 weight percent of carbonate units and from 0.1 to 50 weight percent of siloxane units.

The thermoplastic composition may comprise at least 1.0 weight percent or more of the phosphorous-containing flame retardant, including at least 1.5 weight percent. Alternatively, the thermoplastic composition may comprise from about 1.0 to about 8 weight percent of the phosphorous-containing flame retardant. Sometimes, the thermoplastic composition may comprise at least 12 weight percent of the polysiloxane-polycarbonate copolymer and at least 1.5 weight percent of the phosphorous-containing flame retardant. Alternatively, the thermoplastic composition comprises at least 0.09 weight percent of phosphorous originating from the phosphorous-containing flame retardant, including from about 0.14 to about 0.71 weight percent of phosphorous originating from the phosphorous-containing flame retardant. Sometimes, the thermoplastic composition comprises from about 0.5 to about 6 weight percent of siloxane originating from the polysiloxane-polycarbonate copolymer and at least 0.09 weight percent of phosphorous originating from the phosphorous-containing flame retardant. The thermoplastic composition does not contain additional impact modifier in some embodiments.

The composition may also have a notched Izod impact strength of 12 kJ/m$^2$ or greater, when measured according to ISO 180.

The filler may comprise from about 0.01 to 10 weight percent of the composition. The filler is desirably glass.

In some embodiments, the thermoplastic composition has a Vicat B50 softening temperature of at least 130° C. when measured according to ISO 306 and a heat deflection temperature of at least 120° C. when measured according to ISO 75. In others, the thermoplastic composition may also have a notched Izod impact strength of 15 kJ/m$^2$ or greater, when measured according to ISO 180.

Disclosed in other embodiments is a flame retardant thermoplastic composition, consisting essentially of: a bisphenol-A homopolymer; a polysiloxane-polycarbonate copolymer; bisphenol-A bis(diphenylphosphate); and a reinforcing agent; wherein the thermoplastic composition has a Vicat B50 softening temperature of at least 120° C., when measured according to ISO 306; and wherein an article molded from the thermoplastic composition can attain UL94 V0 performance at a thickness of 1.0 mm.

The polysiloxane-polycarbonate copolymer may comprise from 6 to about 24 weight percent of the thermoplastic composition. The thermoplastic composition may comprise at least 1.5 weight percent of the bisphenol-A bis(diphenylphosphate). The reinforcing agent may be a glass filler, and may comprise from about 8 to about 25 weight percent of the composition.

Disclosed in other embodiments is a flame retardant thermoplastic composition comprising: a polysiloxane-polycarbonate copolymer; an optional polycarbonate polymer; a phosphorous-containing flame retardant; and a reinforcing agent; wherein the thermoplastic composition has a Vicat B50 softening temperature of at least 120° C. when measured according to ISO 306 and a heat deflection temperature of at least 110° C. when measured according to ISO 75; and wherein an article molded from the thermoplastic composition can attain UL94 V0 performance at a thickness of 1.2 mm.

Disclosed in other embodiments is a flame retardant thermoplastic composition comprising: a polysiloxane-polycarbonate copolymer; an optional polycarbonate polymer; at least 1 weight percent of a phosphorous-containing flame retardant; and from about 0.01 to 25 weight percent of a filler comprising glass or talc; wherein the thermoplastic composition has a Vicat B50 softening temperature of at least 120° C. when measured according to ISO 306 and a heat deflection temperature of at least 110° C. when measured according to ISO 75; and wherein an article molded from the thermoplastic composition can attain UL94 V0 performance at a thickness of 1.2 mm.

Disclosed in yet other embodiments is a flame retardant thermoplastic composition, comprising: a polysiloxane-polycarbonate copolymer; an optional polycarbonate polymer; a phosphorous-containing flame retardant; and a filler comprising glass or talc; wherein the thermoplastic composition comprises from about 1.2 to about 6 weight percent of siloxane originating from the polysiloxane-polycarbonate copolymer; wherein the thermoplastic composition has a Vicat B50 softening temperature of at least 120° C. when measured according to ISO 306; and wherein an article molded from the thermoplastic composition can attain UL94 V0 performance at a thickness of 1.2 mm.

These and other non-limiting characteristics are more particularly described below.

DETAILED DESCRIPTION

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The present disclosure may be understood more readily by reference to the following detailed description of preferred embodiments and the examples included therein. In the following specification and the claims which follow, reference will be made to a number of terms which shall be defined to have the following meanings.

The singular forms "a," "an," and "the" include plural referents unless the context clearly dictates otherwise. All ranges disclosed herein are inclusive of the recited endpoint and independently combinable (for example, the range of "from 2 grams to 10 grams" is inclusive of the endpoints, 2 grams and 10 grams, and all the intermediate values).

The modifier "about" used in connection with a quantity is inclusive of the stated value and has the meaning dictated by the context (for example, it includes at least the degree of error associated with the measurement of the particular quantity).

The term "integer" means a whole number and includes zero. For example, the expression "n is an integer from 0 to 4" means n may be any whole number from 0 to 4, including 0.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen or may be composed exclusively of carbon and hydrogen ("Alkyl"). Aliphatic groups may be substituted or unsubstituted. Exemplary aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted or unsubstituted. Exemplary alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph-).

The terms "cycloaliphatic" and "alicyclic" refer to an array of atoms which is cyclic but which is not aromatic. The cycloaliphatic group may include heteroatoms such as nitrogen, sulfur, selenium, silicon and oxygen, or may be composed exclusively of carbon and hydrogen. A cycloaliphatic group may comprise one or more noncyclic components. For example, a cyclohexylmethyl group (C$_6$H$_{11}$CH$_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The thermoplastic compositions of the present disclosure comprise (A) an optional polycarbonate polymer; (B) a polysiloxane-polycarbonate copolymer; (C) a phosphorous-containing flame retardant; and (D) a filler which is either glass or talc.

As used herein, the terms "polycarbonate" and "polycarbonate polymer" mean compositions having repeating structural carbonate units of the formula (1):

(1)

in which at least about 60 percent of the total number of R$^1$ groups are aromatic organic radicals and the balance thereof are aliphatic, alicyclic, or aromatic radicals. In one embodiment, each R$^1$ is an aromatic organic radical, for example a radical of the formula (2):

(2)

wherein each of A$^1$ and A$^2$ is a monocyclic divalent aryl radical and Y$^1$ is a bridging radical having one or two atoms that separate A$^1$ from A$^2$. In an exemplary embodiment, one atom separates A$^1$ from A$^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

wherein $Y^1$, $A^1$ and $A^2$ are as described above. Also included are bisphenol compounds of general formula (4):

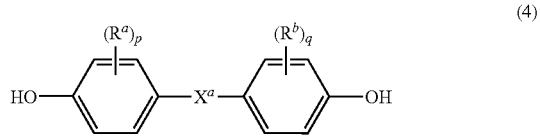

wherein $R^a$ and $R^b$ each represent a halogen atom or a monovalent hydrocarbon group and may be the same or different; p and q are each independently integers of 0 to 4; and $X^a$ represents one of the groups of formula (5):

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl -4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid, and benzophenone tetracarboxylic acid. The branching agents may be added at a level of about 0.05 wt % to about 2.0 wt %. All types of polycarbonate end groups are contemplated as being useful in the polycarbonate composition, provided that such end groups do not significantly affect desired properties of the thermoplastic compositions.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Rather than utilizing the dicarboxylic acid per se, it is possible, and sometimes even desired, to employ the reactive derivatives of the acid, such as the corresponding acid halides, in particular the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X^-$, wherein each $R^3$ is the same or different, and is a $C_{1-10}$ alkyl group; Q is a nitrogen or phosphorus atom; and X is a halogen atom or a $C_{1-8}$ alkoxy group or a $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

"Polycarbonates" and "polycarbonate polymers" as used herein further includes blends of polycarbonates with other copolymers comprising carbonate chain units. An exemplary copolymer is a polyester carbonate, also known as a copolyester-polycarbonate. Such copolymers further contain, in addition to recurring carbonate chain units of the formula (1), repeating units of formula (6)

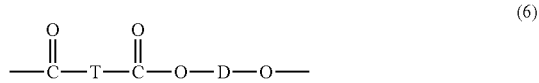

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^k$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In other embodiments, poly(alkylene terephthalates) may be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (8):

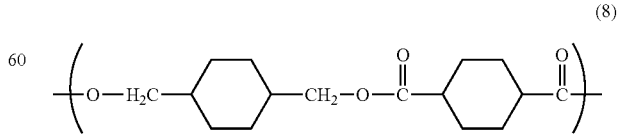

(8)

wherein, as described using formula (6), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

Another exemplary copolymer comprises polycarbonate blocks and polydiorganosiloxane blocks, also known as a polycarbonate-polysiloxane copolymer. The polycarbonate blocks in the copolymer comprise repeating structural units of formula (1) as described above, for example wherein $R^1$ is of formula (2) as described above. These units may be derived from reaction of dihydroxy compounds of formula (3) as described above.

The polydiorganosiloxane blocks comprise repeating structural units of formula (9) (sometimes referred to herein as 'siloxane'):

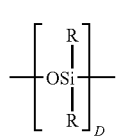
(9)

wherein each occurrence of R is same or different, and is a $C_{1-13}$ monovalent organic radical. For example, R may be a $C_{1-13}$ alkyl group, $C_{1-13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (9) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (10):

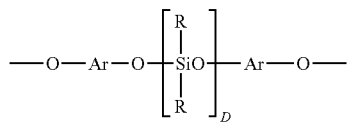
(10)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (10) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl)ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl)cyclohexane, bis(4-hydroxyphenyl sulphide), and 1,1-bis(4-hydroxy-t-butylphenyl) propane. Combinations comprising at least one of the foregoing dihydroxy compounds may also be used.

Such units may be derived from the corresponding dihydroxy compound of the following formula (11):

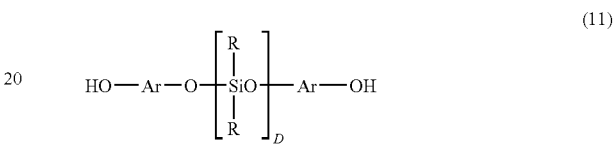
(11)

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (12):

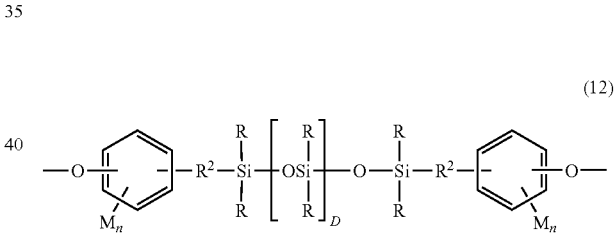
(12)

wherein R and D are as defined above. $R^2$ in formula (12) is a divalent $C_2$-$C_8$ aliphatic group. Each M in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (13):

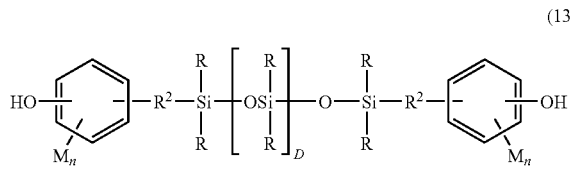

wherein R, D, M, R², and n are as described above.

Such dihydroxy polysiloxanes can be made by effecting a platinum catalyzed addition between a siloxane hydride of the formula (14),

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

A polycarbonate-polysiloxane copolymer may be manufactured by reaction of diphenolic polysiloxane (13) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., desirably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above. Siloxane groups may also be present at or attached to the ends of the copolymer as well.

In the production of a polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt % to about 99 wt % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt % to about 75 wt %, or about 1 wt % to about 50 wt % polydimethylsiloxane, or an equivalent molar amount of another polydiorganosiloxane. In one embodiment, the copolymer comprises about 5 wt % to about 40 wt %, optionally about 5 wt % to about 25 wt % polydimethylsiloxane, or an equivalent molar amount of another polydiorganosiloxane, with the balance being polycarbonate. In a particular embodiment, the copolymer may comprise about 20 wt % siloxane.

In specific embodiments, the polycarbonate polymer is derived from a dihydroxy compound having the structure of Formula (I):

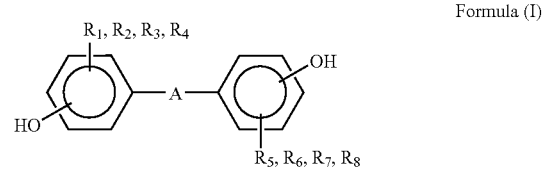

Formula (I)

wherein $R_1$ through $R_8$ are each independently selected from hydrogen, halogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic.

In specific embodiments, the dihydroxy compound of Formula (I) is 2,2-bis(4-hydroxyphenyl) propane (i.e. bisphenol-A or BPA). Other illustrative compounds of Formula (I) include:

2,2-bis(3-bromo-4-hydroxyphenyl)propane;
2,2-bis(4-hydroxy-3-methylphenyl)propane;
2,2-bis(4-hydroxy-3-isopropylphenyl)propane;
2,2-bis(3-t-butyl-4-hydroxyphenyl)propane;
2,2-bis(3-phenyl-4-hydroxyphenyl)propane;
2,2-bis(3,5-dichloro-4-hydroxyphenyl)propane;
1,1-bis(4-hydroxyphenyl)cyclohexane;
1,1-bis(3-chloro-4-hydroxyphenyl)-3,3,5-trimethylcyclohexane;
4,4'dihydroxy-1,1-biphenyl;
4,4'-dihydroxy-3,3'-dimethyl-1,1-biphenyl;
4,4'-dihydroxy-3,3'-dioctyl-1,1-biphenyl;
4,4'-dihydroxydiphenylether;
4,4'-dihydroxydiphenylthioether; and
1,3-bis(2-(4-hydroxyphenyl)-2-propyl)benzene.

In more specific embodiments, the polycarbonate polymer (A) is a bisphenol-A homopolymer. Exemplary bisphenol-A polymers may have a weight average molecular weight (Mw) from 18,000 to 35,000, according to polycarbonate standards.

The polysiloxane-polycarbonate copolymer (B) of the thermoplastic composition has the structure described above regarding Formula (1) and Formulas (9)-(14). The polysiloxane-polycarbonate copolymer comprises 50 to 99.9 wt % of carbonate units and 0.1 to 50 wt % siloxane units, specifically 0.1 to 25 wt % siloxane units, based on the total weight of the polysiloxane-polycarbonate copolymer.

In specific embodiments, the polysiloxane-polycarbonate copolymer comprises 90 to 99 wt % of carbonate units and 1 to 10 wt % of siloxane units. In other embodiments, the polysiloxane-polycarbonate copolymer comprises 92 to 98 wt % of carbonate units and 2 to 8 wt % of siloxane units. In further embodiments, the polysiloxane-polycarbonate copolymer comprises 93 to 97 wt % of carbonate units and 3 to 7 wt % of siloxane units. In more particular embodiments, the polysiloxane-polycarbonate copolymer comprises 93 to 96 wt % of carbonate units and 4 to 7 wt % of siloxane units. In some embodiments, the polysiloxane-polycarbonate copolymer comprises 75 to 90 wt % of carbonate units and 10 to 25 wt % of siloxane units. In additional embodiments, the polysiloxane-polycarbonate copolymer comprises 75 to 85 wt % of carbonate units and 15 to 25 wt % of siloxane units. In other embodiments, the polysiloxane-polycarbonate copolymer comprises 77 to 83 wt % of carbonate units and 17 to 23 wt % of siloxane units. In specific embodiments, the polysiloxane-polycarbonate copolymer comprises 78 to 82 wt % of carbonate units and 18 to 22 wt % of siloxane units. In other exemplary embodiments, the polysiloxane-polycarbonate comprises about 20 wt % siloxane units. All references to weight percentages in the polysiloxane-polycarbonate copolymer are based on the total weight of the polysiloxane-polycarbonate copolymer. Exemplary polysiloxane-polycarbonate copolymers are commercially available as LEXAN® EXL from SABIC Innovative Plastics.

In some embodiments, the polysiloxane-polycarbonate copolymer comprises polysiloxane units, and carbonate units derived from bisphenol-A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000 g/mol, specifically 5,000 to 50,000 g/mol as measured by gel permeation chromatography using a crosslinked styrene-divinyl benzene column, at a sample concentration of 1 milligram per milliliter, and as calibrated with polycarbonate standards.

The phosphorous-containing flame retardant (C) of the thermoplastic composition may be an organic phosphate and/or an organic compound containing phosphorus-nitrogen bonds. One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)$_p$-tolyl phosphate, tritolyl phosphate, bis(2-ethylhexyl)phenyl phosphate, tri(nonylphenyl)phosphate, bis (dodecyl)$_p$-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

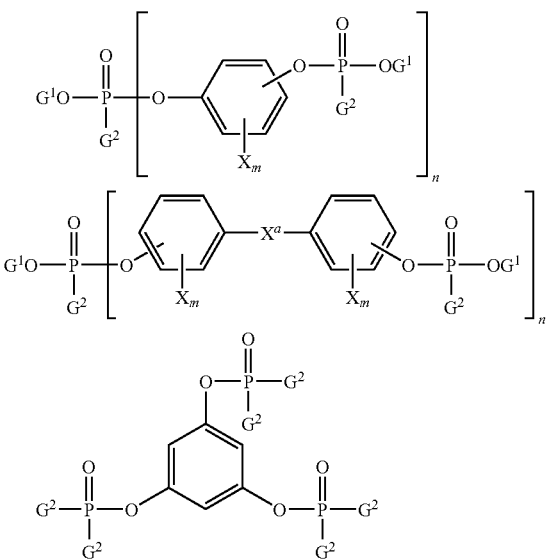

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m 0 to 4, and n is 1 to about 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like. Methods for the preparation of the aforementioned di- or polyfunctional aromatic compounds are described in British Patent No. 2,043,083.

Desirably, the phosphorous-containing flame retardant does not contain any halogens. In particular embodiments, the phosphorous-containing flame retardant is bisphenol-A bis(diphenylphosphate). Phosphorus-containing flame retardants were found to be less sensitive/more robust in long-term tests compared to flame retardant salts like potassium perfluorobutane sulfonate (Rimar salt) or potassium diphenylsulfon-3-sulfonate (KSS).

The thermoplastic composition further includes a reinforcing agent or filler (D) which is either a glass filler or a talc filler. The term "glass filler" refers generally to a material, natural or synthetic, which contains silicon dioxide ($SiO_2$) or silica as its main material. Glass fillers may include, for example, silicate spheres, cenospheres, aluminosilicate (armospheres), or the like, or fiberglass. The glass filler may take any shape, for example as glass spheres, glass fibers or "whiskers", or glass flakes. The talc filler is talc and may take any shape, including fibrous, modular, needle shaped, lamellar talc, or the like. In some embodiments, both glass filler and talc filler are present in the thermoplastic composition.

In embodiments, the thermoplastic composition comprises from 0 to about 86 wt % polycarbonate polymer (A); at least 6 wt % polysiloxane-polycarbonate polymer (B); and 1.0 weight percent or more of the phosphorous-containing flame retardant (C). It should be noted that polycarbonate polymer (A), when present, is different from polysiloxane-polycarbonate polymer (B). The thermoplastic composition comprises from 5 to 100 parts by weight of the polysiloxane-polycarbonate copolymer and from 0 to 95 parts by weight of the optional polycarbonate polymer, based on a combined 100 parts by weight of the polysiloxane-polycarbonate copolymer and the optional polycarbonate polymer. The polysiloxane-polycarbonate copolymer itself may comprise from 50 to 99.9 weight percent of carbonate units and from 0.1 to 50 weight percent of siloxane units.

In particular embodiments, the thermoplastic composition comprises at least 12 weight percent of the polysiloxane-polycarbonate copolymer, including from 12 to about 24 weight percent of the polysiloxane-polycarbonate copolymer.

In some embodiments, the polysiloxane-polycarbonate copolymer is present in the thermoplastic composition in an amount of from about 5 to 100 parts by weight, based on a combined 100 parts by weight of the polysiloxane-polycarbonate copolymer (B) and the polycarbonate polymer (A). In some specific embodiments, the polysiloxane-polycarbonate copolymer is present in the thermoplastic composition in an amount of about 5 to 99 parts by weight; about 50 to 99 parts by weight; about 55 to 99 parts by weight; about 60 to 95 parts by weight; or about 65 to 90 parts by weight, based on a combined 100 parts by weight of the polysiloxane-polycarbonate copolymer (B) and the polycarbonate polymer (A). In other specific embodiments, the polysiloxane-polycarbonate copolymer is present in the thermoplastic composition in an amount of about 5 to about 30 parts by weight; about 5 to about 25 parts by weight; or about 5 to about 20 parts by weight, based on a combined 100 parts by weight of the polysiloxane-polycarbonate copolymer (B) and the polycarbonate polymer (A).

Also in embodiments, the thermoplastic composition may have siloxane content of from about 0.1 wt % to about 6 wt % originating from the polysiloxane-polycarbonate copolymer (B), based on the total weight of the thermoplastic composition. In more specific embodiments, the thermoplastic composition has from about 0.5 wt % to about 6 wt %; about 1.2 wt % to about 6 wt %; about 2.4 wt % to about 6 wt %; about 1 wt % to about 5 wt %; or about 1 wt % to about 4 wt % of siloxane originating from the polysiloxane-polycarbonate copolymer (B), based on the total weight of the thermoplastic composition.

In specific embodiments, the thermoplastic composition may comprise at least 1.0 weight percent of the phosphorous-containing flame retardant (C), including at least 1.0 weight percent, from 1.0 to about 8 weight percent, and from about 2 to about 8 weight percent. Phrased using a different basis, the thermoplastic composition comprises at least 0.09 weight percent of phosphorous originating from the phosphorous-containing flame retardant, including from about 0.14 to about 0.71 weight percent.

In particular embodiments, the polysiloxane-polycarbonate copolymer (B) is the only component that can act as an impact modifier. No additional impact modifiers, such as graft copolymers (e.g. modified with rubber or containing styrene), are included in the thermoplastic composition. Put in different terms, the thermoplastic composition includes only a single impact modifier, the polysiloxane-polycarbonate copolymer (B). Similarly, the thermoplastic composition does not include carbon nanotubes. Using yet other words, the thermoplastic composition may consist essentially of the optional polycarbonate polymer (A), the polysiloxane-polycarbonate copolymer (B), the phosphorous-containing flame retardant (C), and the filler (D).

In embodiments, the reinforcing agent or filler (D) comprises from about 0.01 to 25 weight percent of the thermoplastic composition, specifically from about 0.01 to 10 weight percent, and more specifically from about 0.01 to 5 weight percent. In other embodiments, the thermoplastic composition comprises the filler in an amount of about 0.01 to about 25 parts by weight, specifically about 0.05 to about 15 parts by weight, more specifically about 6 to about 12 parts by weight, still more specifically about 7 to about 11 parts by weight, based on a combined 100 parts by weight of polysiloxane-polycarbonate (B) and any added polycarbonate (A). Desirably, the filler is glass.

The thermoplastic compositions of the present disclosure achieve improved flame retardance properties. For example, an article molded from the thermoplastic composition can attain UL94 V0 performance at a thickness of 1.2 mm or even 1.0 mm. The thermoplastic composition will also have a Vicat B50 softening temperature of at least 120° C. or at least 130° C., when measured according to ISO 306; a heat deflection temperature of at least 110° C. or 120° C. when measured according to ISO 75; and/or a notched Izod impact strength of at least 12 kJ/m$^2$ or at least 15 kJ/m$^2$ when measured according to ISO 180. The thermoplastic composition may have a combination of any two or three of these properties. In specific embodiments, the thermoplastic composition has a Vicat B50 softening temperature of at least 120° C. and a heat deflection temperature of at least 110° C. In other embodiments, the thermoplastic composition has a Vicat B50 softening temperature of at least 130° C. and a heat deflection temperature of at least 120° C. In yet other embodiments, the thermoplastic composition has a Vicat B50 softening temperature of at least 130° C.; a heat deflection temperature of at least 120° C.; and a notched Izod impact strength of at least 15 kJ/m$^2$.

The thermoplastic composition may also include various additives such as fillers, reinforcing agents, stabilizers, and the like, with the proviso that the additives do not adversely affect the desired properties of the thermoplastic compositions. Mixtures of additives may be used. Such additives may be mixed at a suitable time during the mixing of the components for forming the composition.

Examples of suitable fillers or reinforcing agents include any materials known for these uses. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as TiO$_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; wollastonite; surface-treated wollastonite; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly (phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about zero to about 50 parts by weight, optionally about 1 to about 20 parts by weight, and in some embodiments, about 4 to about 15 parts by weight, based on 100 parts by weight of the polymer components (A), (B), (C), and (D).

The thermoplastic composition may comprise a primary antioxidant or "stabilizer" (e.g., a hindered phenol and/or secondary aryl amine) and, optionally, a secondary antioxidant (e.g., a phosphate and/or thioester). Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 1 parts by weight, optionally about 0.05 to about 0.5 parts by weight, based on 100 parts by weight of the polymer components (A), (B), (C), and (D).

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 5 parts by weight, optionally about 0.05 to about 0.3 parts by weight, based on 100 parts by weight of the polymer components (A), (B), (C), and (D).

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 10 parts by weight, optionally about 0.1 to about 1 parts by weight, based on 100 parts by weight of the polymer components (A), (B), (C), and (D).

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis (4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 to about 5 parts by weight, based on 100 parts by weight of the polymer components (A), (B), (C), and (D).

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 0.1 to about 20 parts by weight, optionally about 1 to about 10 parts by weight, based on 100 parts by weight of the polymer components (A), (B), (C), and (D).

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides, polyether-polyamide (polyetheramide) block copolymers, polyetheresteramide block copolymers, polyetheresters, or polyurethanes, each containing polyalkylene glycol moieties such as polyethylene glycol, polypropylene glycol, polytetramethylene glycol, and the like. Such polymeric antistatic agents are commercially available, such as, for example, Pelestat™ 6321 (Sanyo), Pebax™ MH1657 (Atofina), and Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 0.1 to about 10 parts by weight, based on 100 parts by weight of the polymer components (A), (B), (C), and (D).

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 to about 10 parts by weight, based on 100 parts by weight of the polymer components (A), (B), (C), and (D).

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino -4-methylquinolone-2; 2-(4-(4-dimethylaminophenyl)-1,3-butadienyl) -3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 0.1 to about 10 ppm, based on 100 parts by weight of the polymer components (A), (B), (C), and (D).

Additional flame retardants may be added as desired. Suitable flame retardants that may be added may be organic compounds that include phosphorus, bromine, and/or chlorine. Non-brominated and non-chlorinated phosphorus-containing flame retardants may be desired in certain applications for regulatory reasons, for example organic phosphates and organic compounds containing phosphorus-nitrogen bonds.

Exemplary flame retardants may include: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis -(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis -(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro -3-methoxyphenyl)-methane; and 2,2-bis-(3,5-dichloro-4-hydroxyphenyl) -propane 2,2bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant.

Inorganic flame retardants may also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or a fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, about 50 wt % PTFE and about 50 wt % SAN, based on the total weight of the encapsulated fluoropolymer. The SAN may comprise, for example, about 75 wt % styrene and about 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon dioxide or ammonia gas, such as azodicarbonamide, metal salts of azodicarbonamide, 4,4'oxybis(benzenesulfonylhydrazide), sodium bicarbonate, ammonium carbonate, or the like; or combinations comprising at least one of the foregoing blowing agents.

The thermoplastic compositions may be manufactured by methods generally available in the art. For example, in one embodiment, in one manner of proceeding, the components (A), (B), (C), and (D) and any other optional components (such as antioxidants, mold release agents, and the like) are first blended, in a Henschel™ high speed mixer or other suitable mixer/blender. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the polycarbonate compositions are also provided. The thermoplastic compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the polycarbonate compositions may be used for such applications as automotive panel and trim. Examples of suitable articles are exemplified by but are not limited to aircraft, automotive, truck, military vehicle (including automotive, aircraft, and water-borne vehicles), scooter, and motorcycle exterior and interior components, including panels, quarter panels, rocker panels, trim, fenders, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings; personal water-craft; jet-skis; pools; spas; hot tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; hand held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming. The articles made from the composition of the present invention may be used widely in automotive industry, home appliances, electrical components, and telecommunications.

The following examples are provided to illustrate the thermoplastic polycarbonate compositions, articles, and methods of the present disclosure. The examples are merely illustrative and are not intended to limit the disclosure to the materials, conditions, or process parameters set forth therein.

EXAMPLES

Procedure

Flammability tests were performed following the procedure of Underwriter's Laboratory Bulletin 94 entitled "Tests for Flammability of Plastic Materials, UL94", which is incorporated herein by reference. According to this procedure, the materials were classified as either UL94 V0, UL94 V1 or UL94 V2 on the basis of the test results obtained for five samples. The procedure and criteria for each of these flammability classifications according to UL94, are, briefly, as follows:

Procedure: Multiple specimens (either 5 or 10) are tested per thickness. Some specimens are tested after conditioning for 48 hours at 23° C., 50% relative humidity. The other specimens are tested after conditioning for 168 hours at 70° C. The bar is mounted with the long axis vertical for flammability testing. The specimen is supported such that its lower end is 9.5 mm above the Bunsen burner tube. A blue 19 mm high flame is applied to the center of the lower edge of the specimen for 10 seconds. The time until the flaming of the bar ceases is recorded. If burning ceases, the flame is re-applied for an additional 10 seconds. Again, the time until the flaming of the bar ceases is recorded. If the specimen drips particles, these shall be allowed to fall onto a layer of untreated surgical cotton placed 305 mm below the specimen.

Criteria for flammability classifications according to UL94:

|  | V0 | V1 | V2 |
|---|---|---|---|
| Individual flame time (sec) | ≦10 | ≦30 | ≦30 |
| Total flame time of 5 specimens (sec) | ≦50 | ≦250 | ≦250 |
| Glowing time of individual specimens (sec) | ≦30 | ≦60 | ≦60 |
| Particles ignite cotton? | No | No | Yes |

The total flame out times were reported in the Examples as FOT, along with the number of specimens.

Mechanical properties were measured according to the following ISO standards, as indicated:

|  | Standards | Testing Conditions |
|---|---|---|
| Notched Izod Impact Strength | ISO 180 | 3.0 mm, 25° C. |
| Heat Deflection Temperature | ISO 75 | 1.8 MPa, flat |
| Vicat B50 | ISO 306 | B/50 |
| Melt Volume Rate | ISO 1133 | 300° C., 1.2 kg, 4 minutes |

The Examples discussed herein used the following ingredients in their compositions:

| Ingredient | Description | Supplier |
|---|---|---|
| TBPP | tri(di-t-butylphenyl)phosphite, stabilizer | Chemtura |
| PETS | Pentaerythritol tetrastearate, mold release agent, 90% esterified | FACI |
| TSAN | polytetrafluoroethylene encapsulated in styrene-acrylonitrile copolymer, anti-drip agent | Sabic Innovative Plastics |
| PC-Si | a BPA polycarbonate-polydimethylsiloxane copolymer comprising about 20% by weight of siloxane, 80% by weight of BPA, PCP encapped | Sabic Innovative Plastics |
| PB7 | Pigment Black 7 | Degussa |
| BPADP/PC | mixture of bisphenol-A bis(diphenylphosphate) and PC-1, 25/75 wt %/wt % | Sabic Innovative Plastics (BPA-DP from Chemtura) |
| PC-1 | a BPA polycarbonate resin having a PC Mw of 20,000 to 25,000 g/mole. | Sabic Innovative Plastics |
| Fiberglass | non-bonding fiberglass filler | NEG |
| TiO$_2$ | coated titanium dioxide particles as white colorant | Kronos |

Example 1

Four control compositions C1-C4 and four example compositions E1-E4 were made. The example compositions included polycarbonate-polysiloxane copolymer, whereas the control compositions did not. They were then molded and tested for UL94 performance. 10 bars were tested at 1.5 mm thickness and 5 bars were tested at 1.2 mm thickness. The results are shown in Table 1 below. The "Total BPADP" row provides the total amount of BPADP available in the composition.

TABLE 1

| Description | Unit | C1 | C2 | C3 | C4 | E1 | E2 | E3 | E4 |
|---|---|---|---|---|---|---|---|---|---|
| TBPP | wt % | 0.05 | 0.05 | 0.05 | 0.05 | 0.05 | 0.05 | 0.05 | 0.05 |
| PETS | wt % | 0.3 | 0.3 | 0.3 | 0.3 | 0.3 | 0.3 | 0.3 | 0.3 |
| TSAN | wt % | 0.5 | 0.5 | 0.5 | 0.5 | 0.5 | 0.5 | 0.5 | 0.5 |
| PC-Si | wt % |  |  |  |  | 12 | 12 | 12 | 12 |
| BPADP/PC | wt % | 8 | 16 | 24 | 32 | 8 | 16 | 24 | 32 |
| PC-1 | wt % | 82.15 | 74.15 | 66.15 | 58.15 | 70.15 | 62.15 | 54.15 | 46.15 |
| Fiberglass | wt % | 9 | 9 | 9 | 9 | 9 | 9 | 9 | 9 |
| Total BPADP | wt % | 2 | 4 | 6 | 8 | 2 | 4 | 6 | 8 |

TABLE 1-continued

| UL94 Vx 1.5 mm | T1 | T2 | T1 | T2 | T1 | T2 | T1 | T2 | T1 | T2 | T1 | T2 | T1 | T2 | T1 | T2 |
|---|---|---|---|---|---|---|---|---|---|---|---|---|---|---|---|---|
| 48 hours RT | 5 | 3 | 6 | 8 | 5 | 2 | 1 | 5 | 1 | 3 | 1 | 4 | 1 | 2 | 2 | 1 |
| 50% RH | 25 | 1 | 3 | 5 | 1 | 5 | 2 | 4 | 1 | 3 | 1 | 3 | 2 | 2 | 1 | 2 |
|  | 19 | 6 | 5 | 8 | 1 | 4 | 1 | 5 | 1 | 4 | 1 | 2 | 1 | 2 | 1 | 1 |
|  | 6 | 7 | 5 | 5 | 1 | 8 | 1 | 4 | 2 | 2 | 1 | 3 | 1 | 4 | 1 | 2 |
|  | 16 | 5 | 4 | 4 | 3 | 2 | 1 | 4 | 2 | 2 | 1 | 1 | 2 | 2 | 2 | 0 |
|  | 19 | 6 | 4 | 6 | 1 | 1 | 1 | 6 | 2 | 1 | 1 | 1 | 2 | 2 | 1 | 2 |
|  | 10 | 6 | 3 | 6 | 1 | 3 | 1 | 2 | 2 | 4 | 2 | 1 | 1 | 2 | 1 | 1 |
|  | 5 | 8 | 5 | 1 | 1 | 1 | 1 | 3 | 2 | 3 | 1 | 1 | 2 | 2 | 1 | 1 |
|  | 7 | 11 | 4 | 4 | 3 | 2 | 1 | 2 | 2 | 2 | 2 | 2 | 1 | 2 | 1 | 2 |
|  | 14 | 3 | 4 | 17 | 2 | 4 | 1 | 2 | 2 | 1 | 1 | 2 | 1 | 3 | 2 | 1 |
| FOT sum(10 bars) | 182 | | 107 | | 51 | | 48 | | 42 | | 32 | | 37 | | 26 | |
| # of burning drips | 0 | | 0 | | 0 | | 0 | | 0 | | 0 | | 0 | | 0 | |
| bars pass V0 (%) | 40 | | 90 | | 100 | | 100 | | 100 | | 100 | | 100 | | 100 | |
| bars pass V1 (%) | 100 | | 100 | | 100 | | 100 | | 100 | | 100 | | 100 | | 100 | |
| Overall UL94 rating @ 1.5 mm | V1 | | V1 | | V0 | | V0 | | V0 | | V0 | | V0 | | V0 | |

| UL94Vx 1.2 mm | T1 | T2 | T1 | T2 | T1 | T2 | T1 | T2 | T1 | T2 | T1 | T2 | T1 | T2 | T1 | T2 |
|---|---|---|---|---|---|---|---|---|---|---|---|---|---|---|---|---|
| 48 hours RT | >60 | x | 39 | 0 | 11 | 6 | 2 | 6 | 1 | 4 | 2 | 1 | 3 | 4 | 2 | 3 |
| 50% RH | >60 | x | 10 | 5 | 1 | 10 | 2 | 3 | 4 | 2 | 1 | 4 | 1 | 3 | 1 | 2 |
|  |  |  | 28 | 1 | 5 | 4 | 2 | 6 | 1 | 7 | 3 | 2 | 1 | 3 | 1 | 3 |
|  |  |  | 28 | 5 | 5 | 6 | 2 | 5 | 1 | 6 | 1 | 5 | 1 | 3 | 1 | 2 |
|  |  |  | 7 | 23 | 5 | 4 | 1 | 3 | 2 | 2 | 1 | 5 | 1 | 3 | 1 | 2 |
| FOT sum (5 bars) | >250 | | 146 | | 56 | | 32 | | 30 | | 25 | | 23 | | 18 | |
| # of burning drips | 0 | | 0 | | 0 | | 0 | | 0 | | 0 | | 0 | | 0 | |
| bars pass V0 (%) | 0 | | 20 | | 80 | | 100 | | 100 | | 100 | | 100 | | 100 | |
| bars pass V1 (%) | 0 | | 80 | | 100 | | 100 | | 100 | | 100 | | 100 | | 100 | |
| UL94 Rating | none | | none | | V1 | | V0 | | V0 | | V0 | | V0 | | V0 | |
| 168 hours @ 70° C. | 14 | >60 | 7 | 10 | 6 | 2 | 2 | 2 | 2 | 3 | 4 | 3 | 1 | 2 | 2 | 2 |
|  | 23 | 1 | 8 | 7 | 5 | 6 | 1 | 3 | 3 | 5 | 1 | 4 | 1 | 2 | 1 | 2 |
|  | 17 | 8 | 9 | 26 | 6 | 6 | 1 | 3 | 2 | 2 | 1 | 2 | 2 | 3 | 1 | 2 |
|  | >60 | x | 11 | 6 | 3 | 7 | 3 | 3 | 1 | 3 | 1 | 1 | 1 | 2 | 1 | 2 |
|  | 14 | 6 | 6 | 18 | 1 | 13 | 1 | 6 | 1 | 2 | 1 | 3 | 1 | 1 | 1 | 2 |
| FOT sum (5 bars) | >250 | | 108 | | 55 | | 25 | | 24 | | 21 | | 16 | | 16 | |
| # of burning drips | 0 | | 0 | | 0 | | 0 | | 0 | | 0 | | 0 | | 0 | |
| bars pass V0 (%) | 0 | | 40 | | 80 | | 100 | | 100 | | 100 | | 100 | | 100 | |
| bars pass V1 (%) | 60 | | 100 | | 100 | | 100 | | 100 | | 100 | | 100 | | 100 | |
| UL94 Rating | none | | V1 | | V1 | | V0 | | V0 | | V0 | | V0 | | V0 | |
| Overall UL94 rating @ 1.2 mm | none | | none | | V1 | | V0 | | V0 | | V0 | | V0 | | V0 | |
| HDT ° C. | 123 | | 117 | | 111 | | 107 | | 119 | | 113 | | 111 | | 103 | |
| Vicat B @120° C. ° C. | 135 | | 127 | | 120 | | 115 | | 134 | | 127 | | 121 | | 113 | |
| MVR cc/10 min | 18 | | 20 | | 23 | | 27 | | 13 | | 16 | | 18 | | 21 | |

Comparing C1 with E1, C2 with E2, etc., the addition of polycarbonate-polysiloxane copolymer increased the flame retardance properties of the composition. This can be seen in the decreased flame out time (FOT) and improved UL94 ratings for compositions that contained less than 8 wt % BPADP.

Example 2

Six example compositions E5-E10 were made. The amounts of BPADP and polycarbonate-polysiloxane copolymer were varied. They were then molded and tested for UL94 performance at 1.0 mm thickness. 10 bars were tested after conditioning for 48 hours at 23° C., 50% relative humidity. 5 bars were tested after conditioning for 168 hours at 70° C. The results are reported separately in Table 2 below.

TABLE 2

| Description | Unit | E5 | E6 | E7 | E8 | E9 | E10 |
|---|---|---|---|---|---|---|---|
| TBPP | wt % | 0.05 | 0.05 | 0.05 | 0.05 | 0.05 | 0.05 |
| PETS | wt % | 0.3 | 0.3 | 0.3 | 0.3 | 0.3 | 0.3 |
| TSAN | wt % | 0.5 | 0.5 | 0.5 | 0.5 | 0.5 | 0.5 |
| PC-Si | wt % | 12 | 12 | 12 | 24 | 24 | 24 |
| BPADP/PC | wt % | 8 | 16 | 24 | 8 | 16 | 24 |
| PC-1 | wt % | 70.15 | 62.15 | 54.15 | 58.15 | 50.15 | 42.15 |

TABLE 2-continued

| Fiberglass | wt % | 9 | | 9 | | 9 | | 9 | | 9 | | 9 | |
|---|---|---|---|---|---|---|---|---|---|---|---|---|---|
| Total BPADP | wt % | 2 | | 4 | | 6 | | 2 | | 4 | | 6 | |
| UL94 Vx 1.0 mm | | T1 | T2 | T1 | T2 | T1 | T2 | T1 | T2 | T1 | T2 | T1 | T2 |
| 48 hours RT | | 5 | 4 | 1 | 3 | 2 | 2 | 1 | 5 | 1 | 3 | 1 | 3 |
| 50% RH | | 1 | 6 | 1 | 3 | 1 | 3 | 3 | 8 | 1 | 2 | 2 | 4 |
| | | 1 | 6 | 2 | 6 | 2 | 3 | 2 | 9 | 1 | 8 | 1 | 5 |
| | | 5 | 4 | 1 | 2 | 1 | 3 | 2 | 5 | 2 | 2 | 1 | 1 |
| | | 2 | 4 | 2 | 3 | 2 | 2 | 3 | 3 | 2 | 3 | 1 | 3 |
| | | 1 | 4 | 2 | 2 | 1 | 2 | 1 | 3 | 1 | 4 | 1 | 2 |
| | | 2 | 4 | 2 | 2 | 1 | 4 | 1 | 4 | 1 | 3 | 1 | 3 |
| | | 2 | 4 | 1 | 4 | 1 | 1 | 3 | 13 | 2 | 5 | 1 | 3 |
| | | 1 | 3 | 1 | 2 | 2 | 2 | 2 | 4 | 2 | 2 | 1 | 2 |
| | | 2 | 3 | 2 | 2 | 2 | 3 | 1 | 6 | 1 | 4 | 1 | 3 |
| FOT (10 bars) | | 64 | | 44 | | 40 | | 79 | | 50 | | 40 | |
| # of burning drips | | 0 | | 0 | | 0 | | 0 | | 0 | | 0 | |
| bars pass V0 (%) | | 100 | | 100 | | 100 | | 100 | | 100 | | 100 | |
| UL94 Rating | | V0 | | V0 | | V0 | | V0 | | V0 | | V0 | |
| | | T1 | T2 | T1 | T2 | T1 | T2 | T1 | T2 | T1 | T2 | T1 | T2 |
| 168 hours @ 70° C. | | 1 | 3 | 1 | 3 | 2 | 2 | 4 | 5 | 1 | 2 | 1 | 5 |
| | | 2 | 5 | 2 | 3 | 2 | 2 | 3 | 4 | 1 | 1 | 0 | 3 |
| | | 4 | 4 | 1 | 2 | 2 | 2 | 1 | 3 | 2 | 2 | 4 | 3 |
| | | 3 | 3 | 3 | 1 | 1 | 4 | 1 | 3 | 2 | 2 | 1 | 2 |
| | | 1 | 4 | 1 | 3 | 1 | 2 | 1 | 4 | 1 | 1 | 1 | 2 |
| FOT (5 bars) | | 30 | | 20 | | 20 | | 29 | | 15 | | 22 | |
| # of burning drips | | 0 | | 0 | | 0 | | 0 | | 0 | | 0 | |
| bars pass V0 (%) | | 100 | | 100 | | 100 | | 100 | | 100 | | 100 | |
| UL94 Rating | | V0 | | V0 | | V0 | | V0 | | V0 | | V0 | |
| Overall UL94 rating @ 1.0 mm | | V0 | | V0 | | V0 | | V0 | | V0 | | V0 | |

The results showed that compositions containing BPADP, polycarbonate-polysiloxane copolymer, and glass filler could also achieve V0 performance at 1.0 mm thickness.

Example 3

Nine additional example compositions E11-E19 were made. The amounts of BPADP and polycarbonate-polysiloxane copolymer were varied. They were then molded and tested for UL94 performance at 1.2 mm thickness. The results are reported separately in Table 3 below.

TABLE 3

| Description | Unit | E11 | | E12 | | E13 | | E14 | | E15 | |
|---|---|---|---|---|---|---|---|---|---|---|---|
| TBPP | wt % | 0.05 | | 0.05 | | 0.05 | | 0.05 | | 0.05 | |
| PETS | wt % | 0.3 | | 0.3 | | 0.3 | | 0.3 | | 0.3 | |
| TSAN | wt % | 0.5 | | 0.5 | | 0.5 | | 0.5 | | 0.5 | |
| PC-Si | wt % | 6 | | 6 | | 6 | | 12 | | 12 | |
| BPADP/PC | wt % | 4 | | 8 | | 16 | | 4 | | 8 | |
| PC-1 | wt % | 78.625 | | 74.625 | | 66.625 | | 72.625 | | 68.625 | |
| Fiberglass | wt % | 9 | | 9 | | 9 | | 9 | | 9 | |
| TiO2 | wt % | 1.5 | | 1.5 | | 1.5 | | 1.5 | | 1.5 | |
| PB7 | wt % | 0.025 | | 0.025 | | 0.025 | | 0.025 | | 0.025 | |
| Total BPADP | wt % | 1 | | 2 | | 4 | | 1 | | 2 | |
| UL94 Vx 1.2 mm | | T1 | T2 | T1 | T2 | T1 | T2 | T1 | T2 | T1 | T2 |
| 48 hours RT | | 1 | 6 | 1 | 7 | 1 | 3 | 1 | 2 | 1 | 4 |
| 50% RH | | 1 | 9 | 3 | >60 | 1 | 4 | 1 | 15 | 1 | 4 |
| | | 3 | 7 | 2 | 2 | 1 | 2 | 1 | 4 | 1 | 6 |
| | | 3 | >60 | 2 | 4 | 1 | 3 | 3 | 2 | 1 | 3 |
| | | 2 | >60 | 2 | 7 | 1 | 5 | 1 | 5 | 3 | 6 |
| FOT (5 bars) | | >250 | | >250 | | 22 | | 35 | | 30 | |
| # of burning drips | | 0 | | 0 | | 0 | | 0 | | 0 | |
| bars pass V0 (%) | | 60 | | 80 | | 100 | | 80 | | 100 | |
| bars pass V1 (%) | | 60 | | 80 | | 100 | | 100 | | 100 | |
| UL94 Rating | | none | | none | | V0 | | V1 | | V0 | |

TABLE 3-continued

|  |  | T1 | T2 | T1 | T2 | T1 | T2 | T1 | T2 | T1 | T2 |
|---|---|---|---|---|---|---|---|---|---|---|---|
| 168 hours @ 70° C. |  | 5 | 4 | 5 | 2 | 1 | 3 | 1 | 19 | 1 | 4 |
|  |  | 5 | 12 | 1 | 4 | 2 | 2 | 1 | 2 | 1 | 5 |
|  |  | 5 | 3 | 3 | 2 | 1 | 5 | 5 | 2 | 4 | 3 |
|  |  | 1 | 18 | 6 | 3 | 3 | 0 | 1 | 2 | 2 | 4 |
|  |  | 2 | 4 | 2 | 4 | 2 | 3 | 1 | 4 | 1 | 8 |
| FOT (5 bars) |  | 59 | | 32 | | 22 | | 38 | | 33 | |
| # of burning drips |  | 0 | | 0 | | 0 | | 0 | | 0 | |
| bars pass V0 (%) |  | 60 | | 100 | | 100 | | 80 | | 100 | |
| bars pass V1 (%) |  | 100 | | 100 | | 100 | | 100 | | 100 | |
| UL94 Rating |  | V1 | | V0 | | V0 | | V1 | | V0 | |
| Overall UL94 Rating @ 1.2 mm |  | none | | none | | V0 | | V1 | | V0 | |
| HDT | ° C. | 125 | | 120 | | 115 | | 124 | | 122 | |
| Vicat B @ 120° C./h | ° C. | 139 | | 134 | | 127 | | 139 | | 134 | |
| Notched Izod Impact | kJ/m$^2$ | 13 | | 10 | | 7 | | 19 | | 17 | |

| Description | Unit | E16 | E17 | E18 | E19 |
|---|---|---|---|---|---|
| TBPP | wt % | 0.05 | 0.05 | 0.05 | 0.05 |
| PETS | wt % | 0.3 | 0.3 | 0.3 | 0.3 |
| TSAN | wt % | 0.5 | 0.5 | 0.5 | 0.5 |
| PC-Si | wt % | 12 | 18 | 18 | 18 |
| BPADP/PC | wt % | 16 | 4 | 8 | 16 |
| PC-1 | wt % | 60.625 | 66.625 | 62.625 | 54.625 |
| Fiberglass | wt % | 9 | 9 | 9 | 9 |
| TiO2 | wt % | 1.5 | 1.5 | 1.5 | 1.5 |
| PB7 | wt % | 0.025 | 0.025 | 0.025 | 0.025 |
| Total BPADP | wt % | 4 | 1 | 2 | 4 |

| UL94 V x 1.2 mm |  | T1 | T2 | T1 | T2 | T1 | T2 | T1 | T2 |
|---|---|---|---|---|---|---|---|---|---|
| 48 hours RT |  | 1 | 3 | 3 | 7 | 1 | 1 | 1 | 3 |
| 50% RH |  | 1 | 1 | 1 | 8 | 2 | 1 | 1 | 6 |
|  |  | 1 | 3 | 3 | 4 | 1 | 8 | 1 | 2 |
|  |  | 1 | 2 | 2 | 5 | 1 | 4 | 1 | 4 |
|  |  | 2 | 4 | 1 | 15 | 2 | 3 | 1 | 2 |
| FOT (5 bars) |  | 19 | | 49 | | 24 | | 22 | |
| # of burning drips |  | 0 | | 0 | | 0 | | 0 | |
| bars pass V0 (%) |  | 100 | | 80 | | 100 | | 100 | |
| bars pass V1 (%) |  | 100 | | 100 | | 100 | | 100 | |
| UL94 Rating |  | V0 | | V1 | | V0 | | V0 | |

|  |  | T1 | T2 | T1 | T2 | T1 | T2 | T1 | T2 |
|---|---|---|---|---|---|---|---|---|---|
| 168 hours @ 70° C. |  | 1 | 2 | 1 | 8 | 1 | 1 | 0 | 1 |
|  |  | 2 | 3 | 2 | 4 | 4 | 2 | 2 | 1 |
|  |  | 1 | 2 | 5 | 8 | 1 | 5 | 1 | 3 |
|  |  | 1 | 2 | 7 | 2 | 1 | 5 | 1 | 2 |
|  |  | 3 | 1 | 1 | 5 | 1 | 7 | 1 | 2 |
| FOT (5 bars) |  | 18 | | 43 | | 28 | | 14 | |
| # of burning drips |  | 0 | | 0 | | 0 | | 0 | |
| bars pass V0 (%) |  | 100 | | 100 | | 100 | | 100 | |
| bars pass V1 (%) |  | 100 | | 100 | | 100 | | 100 | |
| UL94 Rating |  | V0 | | V0 | | V0 | | V0 | |
| Overall UL94 Rating @ 1.2 mm |  | V0 | | V1 | | V0 | | V0 | |
| HDT | ° C. | 113 | | 124 | | 120 | | 114 | |
| Vicat B @ 120° C./h | ° C. | 126 | | 138 | | 133 | | 126 | |
| Notched Izod Impact | kJ/m$^2$ | 12 | | 20 | | 18 | | 16 | |

The results showed that a V0 performance at 1.2 mm was obtained with 6 wt % of polycarbonate-polysiloxane copolymer when the amount of BPADP was at least 4 wt %. However, when the amount of the polycarbonate-polysiloxane copolymer was increased to 12 wt %, only 2 wt % BPADP was needed to reach V0 performance at 1.2 mm thickness (see E13). Without the copolymer, 8 wt % BPADP was needed to achieve V0 performance and a Vicat temperature lower than 120° C. (see C4 in Table 1). However, at these high levels of BPADP, the Vicat temperature was lower than 120° C. Generally, for electrical applications, higher Vicat temperatures are desired.

Example 4

Three control compositions C5-C7 and eight example compositions E20-E27 were made. The amounts of BPADP and polycarbonate-polysiloxane copolymer were varied. They were then molded and tested for UL94 performance at 1.5 and 1.2 mm thickness after conditioning for 48 hours at 23° C., 50% relative humidity, with five specimens. The results are reported separately in Table 4 below.

TABLE 4

| Description | Unit | C5 | | C6 | | C7 | | E20 | | E21 | | E22 | |
|---|---|---|---|---|---|---|---|---|---|---|---|---|---|
| TBPP | wt % | 0.05 | | 0.05 | | 0.05 | | 0.05 | | 0.05 | | 0.05 | |
| PETS | wt % | 0.3 | | 0.3 | | 0.3 | | 0.3 | | 0.3 | | 0.3 | |
| TSAN | wt % | 0.5 | | 0.5 | | 0.5 | | 0.5 | | 0.5 | | 0.5 | |
| PC-Si | wt % | 0 | | 12 | | 24 | | 12 | | 12 | | 12 | |
| BPADP/PC | wt % | 0 | | 0 | | 0 | | 2 | | 3 | | 4 | |
| PC-1 | wt % | 90.15 | | 78.15 | | 66.15 | | 76.15 | | 75.15 | | 74.15 | |
| Fiberglass | wt % | 9 | | 9 | | 9 | | 9 | | 9 | | 9 | |
| Total BPADP | wt % | 0 | | 0 | | 0 | | 0.5 | | 0.75 | | 1 | |
| UL94 Vx 1.5 mm | | T1 | T2 | T1 | T2 | T1 | T2 | T1 | T2 | T1 | T2 | T1 | T2 |
| 48 hours RT | | 22bd | 35bd | 2 | 9 | 2 | 6 | 1 | 9 | 1 | 7 | 0 | 7 |
| 50% RH | | 63bd | 5 | 1 | 13 | 2 | 12 | 1 | 7 | 1 | 8 | 2 | 4 |
| | | 4 | 8bd | 2 | 12 | 0 | 13 | 0 | 12 | 1 | 2 | 1 | 4 |
| | | 87bd | 2 | 1 | 14 | 2 | 7 | 1 | 19 | 2 | 4 | 1 | 3 |
| | | 4 | 16bd | 11 | 6 | 1 | 17 | 1 | 6 | 4 | 5 | 0 | 6 |
| FOT (5 bars) | | 246 | | 71 | | 62 | | 57 | | 35 | | 28 | |
| # of burning drips | | 6 | | 0 | | 0 | | 0 | | 0 | | 0 | |
| bars pass V0 (%) | | 0 | | 20 | | 40 | | 60 | | 100 | | 100 | |
| bars pass V1 (%) | | 0 | | 100 | | 100 | | 100 | | 100 | | 100 | |
| Overall UL94 rating @ 1.5 mm | | none | | V1 | | V1 | | V1 | | V0 | | V0 | |
| UL94 Vx 1.2 mm | | T1 | T2 | T1 | T2 | T1 | T2 | T1 | T2 | T1 | T2 | T1 | T2 |
| 48 hours RT | | 10 | 6bd | 6 | 12 | 5 | 67bd | 2 | 18 | 3 | 6 | 3 | 3 |
| 50% RH | | 12 | 10bd | 5 | 7 | 8 | 1 | 2 | 33 | 2 | 31 | 2 | 4 |
| | | 6 | 64bd | 4 | 64bd | 6 | 8 | 6 | 6 | 6 | 4 | 2 | 33 |
| | | 79 | 2 | 5 | 7 | 16 | 2 | 2 | 13 | 7 | 4 | 2 | 12 |
| | | 17bd | 36bd | 9 | 6 | 6 | 39 | 4 | 12 | 2 | 4 | 1 | 12 |
| | | | | 3 | 10 | 4 | 7 | 2 | 11 | 3 | 13 | 3 | 11 |
| | | | | 6 | 4 | 12 | 6 | 7 | 4 | 3 | 3 | 3 | 4 |
| | | | | 8 | 2 | 5 | 17 | 1 | 7 | 3 | 9 | 6 | 5 |
| | | | | 5 | 51bd | 7 | 6 | 3 | 7 | 2 | 10 | 2 | 5 |
| | | | | 1 | 63 | 3 | 7 | 6 | 4 | 2 | 16 | 3 | 11 |
| FOT (5 bars) | | 241 | | 153 | | 74 | | 52 | | 64 | | 53 | |
| # of burning drips | | 5 | | 2 | | 1 | | 0 | | 0 | | 0 | |
| bars pass V0 (%) | | 0 | | 60 | | 50 | | 50 | | 70 | | 50 | |
| bars pass V1 (%) | | 0 | | 70 | | 80 | | 90 | | 90 | | 90 | |
| Overall UL94 rating @ 1.2 mm | | none | | none | | none | | none | | none | | none | |

| Description | Unit | E23 | | E24 | | E25 | | E26 | | E27 | |
|---|---|---|---|---|---|---|---|---|---|---|---|
| TBPP | wt % | 0.05 | | 0.05 | | 0.05 | | 0.05 | | 0.05 | |
| PETS | wt % | 0.3 | | 0.3 | | 0.3 | | 0.3 | | 0.3 | |
| TSAN | wt % | 0.5 | | 0.5 | | 0.5 | | 0.5 | | 0.5 | |
| PC-Si | wt % | 12 | | 12 | | 12 | | 12 | | 12 | |
| BPADP/PC | wt % | 4 | | 6 | | 8 | | 8 | | 10 | |
| PC-1 | wt % | 74.15 | | 72.15 | | 70.15 | | 70.15 | | 68.15 | |
| Fiberglass | wt % | 9 | | 9 | | 9 | | 9 | | 9 | |
| Total BPADP | wt % | 1 | | 1.5 | | 2 | | 2 | | 2.5 | |
| UL94 Vx 1.5 mm | | T1 | T2 | T1 | T2 | T1 | T2 | T1 | T2 | T1 | T2 |
| 48 hours RT | | 1 | 6 | 0 | 4 | 0 | 3 | 1 | 4 | 1 | 2 |
| 50% RH | | 0 | 5 | 0 | 3 | 0 | 3 | 0 | 3 | 0 | 4 |
| | | 0 | 6 | 0 | 0 | 2 | 4 | 0 | 3 | 0 | 4 |
| | | 0 | 4 | 0 | 2 | 1 | 1 | 0 | 4 | 0 | 2 |
| | | 0 | 5 | 1 | 1 | 0 | 6 | 1 | 5 | 1 | 3 |
| FOT (5 bars) | | 27 | | 11 | | 20 | | 21 | | 17 | |
| # of burning drips | | 0 | | 0 | | 0 | | 0 | | 0 | |
| bars pass V0 (%) | | 100 | | 100 | | 100 | | 100 | | 100 | |
| bars pass V1 (%) | | 100 | | 100 | | 100 | | 100 | | 100 | |
| Overall UL94 rating @ 1.5 mm | | V0 | | V0 | | V0 | | V0 | | V0 | |
| UL94 Vx 1.2 mm | | T1 | T2 | T1 | T2 | T1 | T2 | T1 | T2 | T1 | T2 |
| 48 hours RT | | 1 | 3 | 3 | 2 | 2 | 6 | 1 | 4 | 2 | 6 |
| 50% RH | | 3 | 4 | 2 | 5 | 0 | 4 | 1 | 6 | 2 | 3 |
| | | 4 | 2 | 2 | 4 | 0 | 2 | 2 | 3 | 1 | 2 |
| | | 2 | 6 | 2 | 4 | 2 | 5 | 1 | 3 | 3 | 2 |
| | | 3 | 4 | 2 | 9 | 4 | 5 | 3 | 4 | 2 | 3 |
| FOT (5 bars) | | 32 | | 35 | | 30 | | 28 | | 26 | |
| # of burning drips | | 0 | | 0 | | 0 | | 0 | | 0 | |
| bars pass V0 (%) | | 100 | | 100 | | 100 | | 100 | | 100 | |
| bars pass V1 (%) | | 100 | | 100 | | 100 | | 100 | | 100 | |
| Overall UL94 rating @ 1.2 mm | | V0 | | V0 | | V0 | | V0 | | V0 | |

C5-C7 did not use BPADP and showed that V0 performance could not be achieved at 1.5 mm thickness, even with 24 wt % polycarbonate-polysiloxane copolymer.

E20-27 showed that in the presence of polycarbonate-polysiloxane, a V0 performance at 1.2 mm thickness could be achieved by increasing the amount of BPADP. The V0 performance at 1.2 mm was consistent when the amount of BPADP was increased above 1 wt %.

The thermoplastic compositions of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A flame retardant thermoplastic composition, comprising:
 a polysiloxane-polycarbonate copolymer;
 an optional polycarbonate polymer;
 from 1 to 2 weight percent of a phosphorous-containing flame retardant; and
 from about 0.01 to 25 weight percent of a filler comprising glass or talc;
 wherein the thermoplastic composition has a Vicat B50 softening temperature of at least 120° C. when measured according to ISO 306 and a heat deflection temperature of at least 120° C. when measured according to ISO 75;
 wherein an article molded from the thermoplastic composition can attain UL94 V0 performance at a thickness of 1.2 mm.

2. The thermoplastic composition of claim 1, wherein the polycarbonate polymer is a bisphenol-A homopolymer.

3. The thermoplastic composition of claim 1, wherein the phosphorous-containing flame retardant is bisphenol-A bis(diphenylphosphate).

4. The thermoplastic composition of claim 1, wherein the thermoplastic composition comprises from about 0.5 to about 6 weight percent of siloxane originating from the polysiloxane-polycarbonate copolymer.

5. The thermoplastic composition of claim 1, wherein the thermoplastic composition comprises from about 1.2 to about 6 weight percent of siloxane originating from the polysiloxane-polycarbonate copolymer.

6. The thermoplastic composition of claim 1, wherein the thermoplastic composition comprises at least 0.09 weight percent of phosphorous originating from the phosphorous-containing flame retardant.

7. The thermoplastic composition of claim 1, wherein the thermoplastic composition does not contain additional impact modifier.

8. The thermoplastic composition of claim 1, wherein an article molded from the thermoplastic composition can attain UL94 V0 performance at a thickness of 1.0 mm.

9. The thermoplastic composition of claim 1, wherein the composition has a notched Izod impact strength of 12 kJ/m² or greater, when measured according to ISO 180.

10. The thermoplastic composition of claim 1, wherein the thermoplastic composition comprises at least 1.5 weight percent of the bisphenol-A bis(diphenylphosphate).

11. The thermoplastic composition of claim 1, wherein the thermoplastic composition comprises from about 0.01 to 10 weight percent of the filler, and the filler is glass.

12. The thermoplastic composition of claim 1, wherein the thermoplastic composition has a Vicat B50 softening temperature of at least 130° C. when measured according to ISO 306.

13. The thermoplastic composition of claim 12, wherein the thermoplastic composition has a notched Izod impact strength of 15 kJ/m² or greater, when measured according to ISO 180.

14. A flame retardant thermoplastic composition, comprising:
 a polysiloxane-polycarbonate copolymer;
 an optional polycarbonate polymer;
 from 1 to 2 weight percent of a phosphorous-containing flame retardant; and
 a reinforcing agent;
 wherein the thermoplastic composition has a Vicat B50 softening temperature of at least 120° C. when measured according to ISO 306 and a heat deflection temperature of at least 120° C. when measured according to ISO 75; and
 wherein an article molded from the thermoplastic composition can attain UL94 V0 performance at a thickness of 1.2 mm.

15. The thermoplastic composition of claim 14, wherein the composition comprises from about 0.01 to 10 weight percent of the reinforcing agent.

16. A flame retardant thermoplastic composition, comprising:
 a polysiloxane-polycarbonate copolymer;
 a polycarbonate polymer;
 from 1 to 2 weight percent of a phosphorous-containing flame retardant; and
 from about 0.01 to 25 weight percent of a filler comprising glass or talc;
 wherein the thermoplastic composition has a Vicat B50 softening temperature of at least 120° C. when measured according to ISO 306 and a heat deflection temperature of at least 120° C. when measured according to ISO 75; and
 wherein an article molded from the thermoplastic composition can attain UL94 V0 performance at a thickness of 1.2 mm.

17. The thermoplastic composition of claim 16, wherein the thermoplastic composition has a notched Izod impact strength of 15 kJ/m² or greater, when measured according to ISO 180.

18. A flame retardant thermoplastic composition, comprising:
 a polysiloxane-polycarbonate copolymer;
 a polycarbonate polymer;
 from 0.75 to 2 weight percent of a phosphorous-containing flame retardant; and
 a filler comprising glass or talc;
 wherein the thermoplastic composition comprises from about 1.2 to about 6 weight percent of siloxane originating from the polysiloxane-polycarbonate copolymer;
 wherein the thermoplastic composition has a Vicat B50 softening temperature of at least 120° C. when measured according to ISO 306 and and a heat deflection temperature of at least 120° C. when measured according to ISO 75; and
 wherein an article molded from the thermoplastic composition can attain UL94 V0 performance at a thickness of 1.5 mm.

* * * * *

UNITED STATES PATENT AND TRADEMARK OFFICE
CERTIFICATE OF CORRECTION

| | | |
|---|---|---|
| PATENT NO. | : 7,994,248 B2 | Page 1 of 1 |
| APPLICATION NO. | : 12/332978 | |
| DATED | : August 9, 2011 | |
| INVENTOR(S) | : van den Bogerd et al. | |

It is certified that error appears in the above-identified patent and that said Letters Patent is hereby corrected as shown below:

Title page, item [75]
Field (75) Inventors should appear as follows:

Joshua Arie van den Bogerd, Tholen (NL); Robert Dirk van de Grampel, Tholen (NL); Jan-Pleun Lens, Rotterdam (NL)

Signed and Sealed this
Thirteenth Day of December, 2011

David J. Kappos
*Director of the United States Patent and Trademark Office*